(12) United States Patent
Stenberg et al.

(10) Patent No.: US 6,757,877 B2
(45) Date of Patent: Jun. 29, 2004

(54) SYSTEM AND METHOD FOR IDENTIFYING AND ELIMINATING BOTTLENECKS IN INTEGRATED CIRCUIT DESIGNS

(75) Inventors: Robert Stenberg, San Jose, CA (US); Ivan Pavisic, San Jose, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 10/083,411

(22) Filed: Feb. 27, 2002

(65) Prior Publication Data

US 2003/0163797 A1 Aug. 28, 2003

(51) Int. Cl.[7] .................................................. G06F 17/50
(52) U.S. Cl. ..................... 716/6; 716/2; 716/9; 716/10; 716/13
(58) Field of Search ............................... 716/2, 6, 9, 10, 716/13, 5, 16; 714/733; 363/20

(56) References Cited

U.S. PATENT DOCUMENTS

| | | | | |
|---|---|---|---|---|
| 5,461,576 A | * | 10/1995 | Tsay et al. ..................... | 716/6 |
| 6,099,583 A | * | 8/2000 | Nag ............................. | 716/16 |
| 6,247,154 B1 | * | 6/2001 | Bushnell et al. ............. | 714/733 |
| 6,289,488 B1 | * | 9/2001 | Dave et al. ................... | 716/10 |

\* cited by examiner

*Primary Examiner*—Thuan Do
(74) *Attorney, Agent, or Firm*—Fitch, Even, Tabin & Flannery

(57) ABSTRACT

A method of integrated circuit design and a circuit design tool. Critical paths are identified in an integrated circuit design. Identified edges are weighted. Edges are assigned a higher weight responsive to the number of critical paths in which they are included. A net criticality is assigned to each weighted edge based upon the edge's weight. Cells are re-placed and wired according to net criticality.

14 Claims, 3 Drawing Sheets

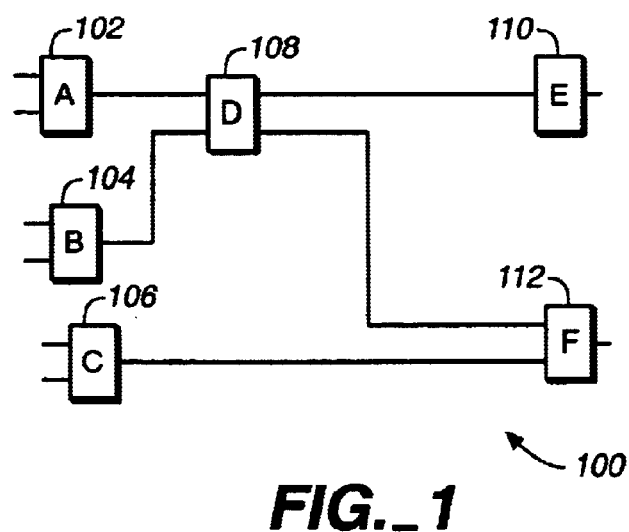
FIG._1
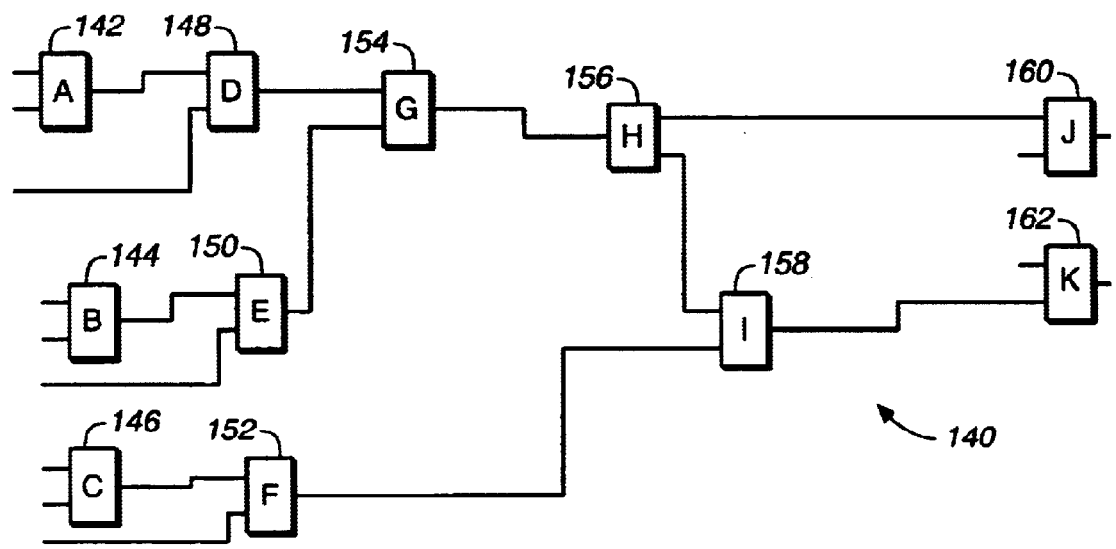
FIG._3

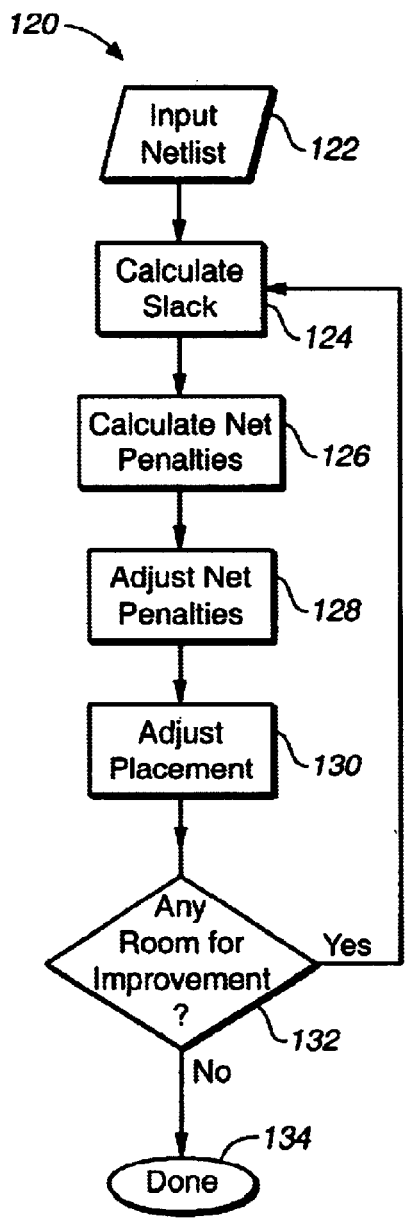
FIG._2
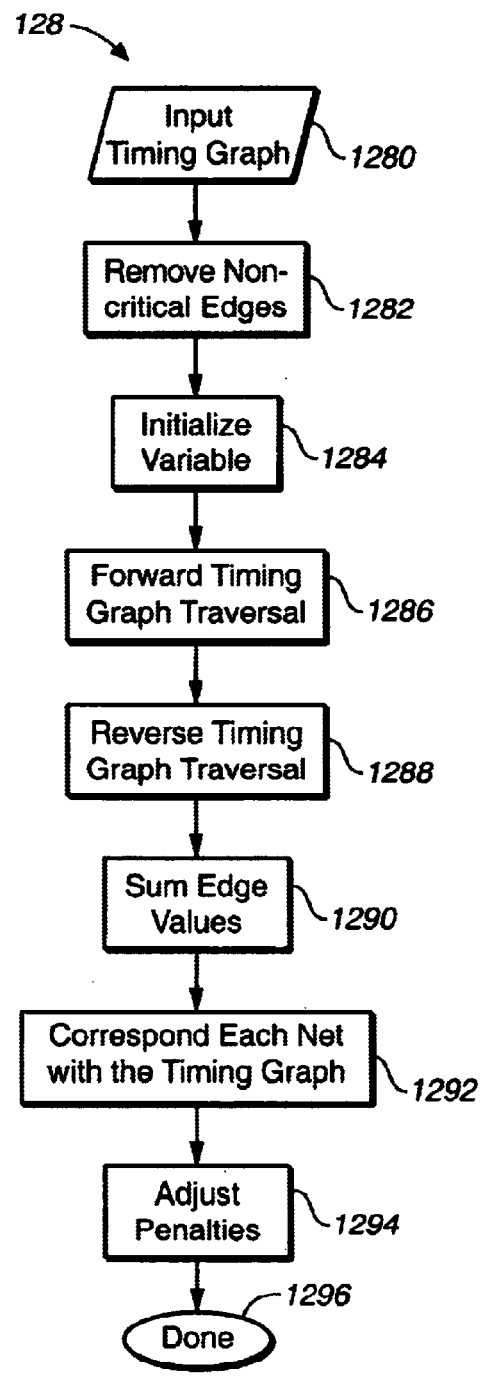
FIG._4

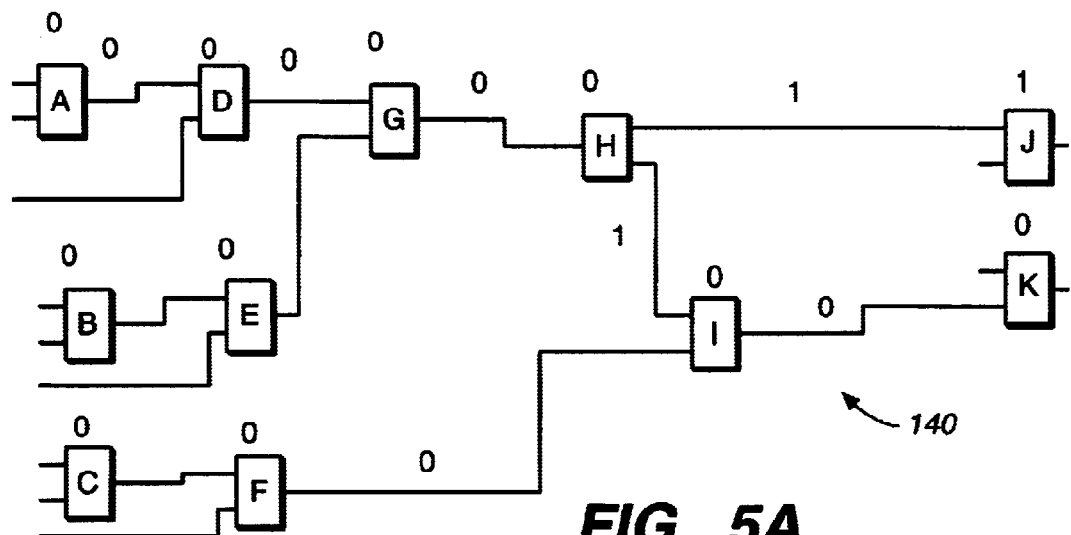
FIG._5A
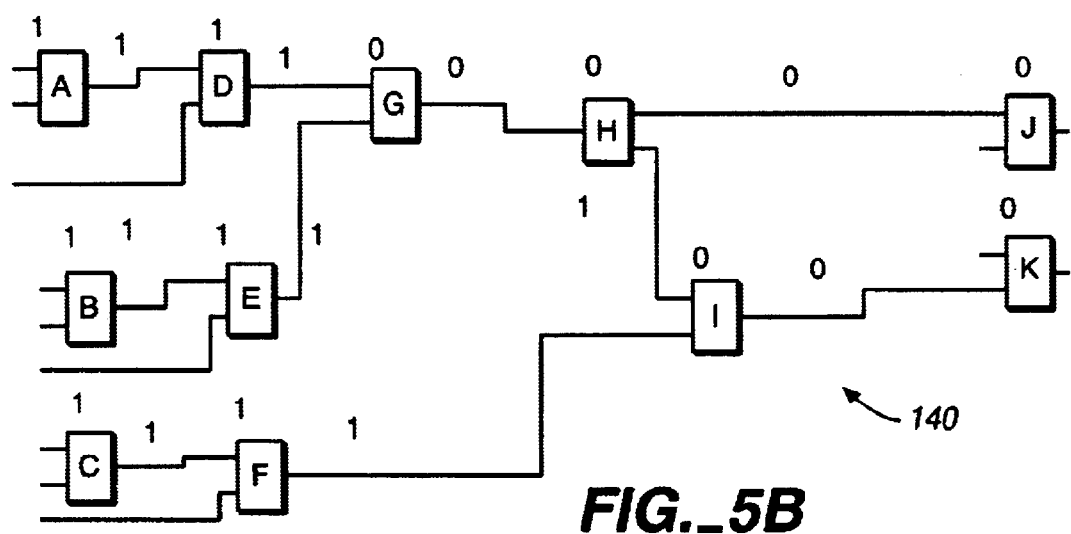
FIG._5B
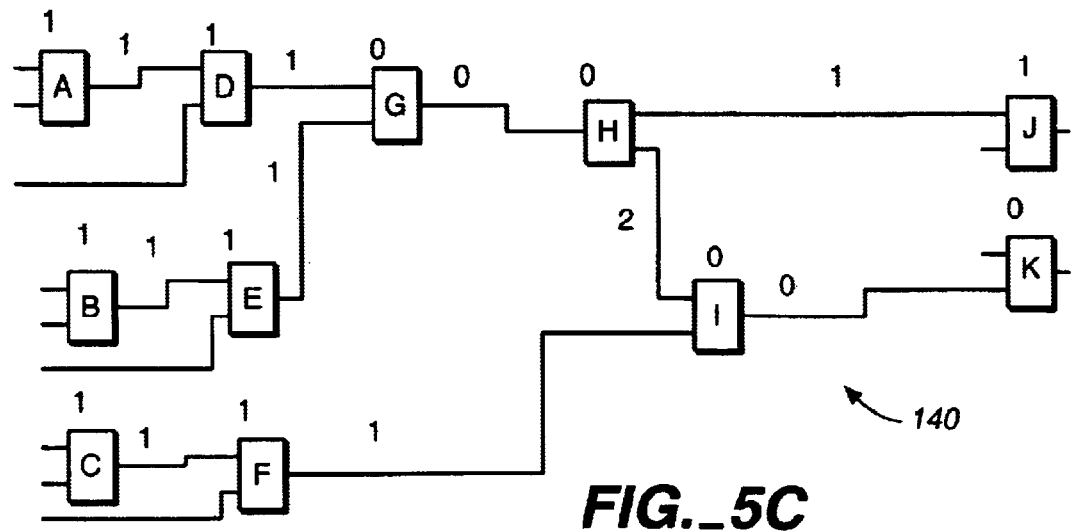
FIG._5C

SYSTEM AND METHOD FOR IDENTIFYING AND ELIMINATING BOTTLENECKS IN INTEGRATED CIRCUIT DESIGNS

BACKGROUND OF THE INVENTION

1. Field of the Invention

The present invention is related to very large scale integrated circuit logic designs and more particularly to timing analysis tools for gate array logic designs.

2. Background Description

State of the art integrated circuit (IC) logic chips have logic that is interactively placed and wired, principally, based upon logic timing. Generally, for a typical synchronous logic chip, logic paths are bracketed by flip flops or registers that are clocked by on-chip clocks, i.e., a clock sets a flip flop at the beginning of a path and after a given (clock) period, the results are locked in a second flip flop at the other end of the path. So, the time between clock edges determines how much time is available for a signal to propagate along the particular path.

Any extra time between the calculated propagation delay time and the clock period is known as slack. Normally by design, there is a required minimum amount of slack specified. Any path having less than that specified required amount of slack is identified as what is known as a critical path, i.e., a path that is most sensitive and so most likely to encounter timing related problems.

A graph may be generated for a logic chip that indicates slack in individual paths and is known as a slack graph. The slack graph may be used to determine which path and associated nets on the chip are critical. Thus, a slack graph may be used to facilitate logic block placement. Further, once critical paths are identified, the slack graph may be used to guide block relocation and path re-design in order to adjust placement of identified critical nets. Building a slack graph and using it as a guide for adjusting logic placement is well known in the art.

A typical logic placement tool can trade off between net length and block placement. By identifying timing critical nets, the tool can adjust either to achieve a better timing. Normally, after identifying critical paths, only those critical path nets are considered for optimization to eliminate criticalities, e.g., re-locating cells, repowering cells and in severe cases, redesigning logic for the critical path. This is a long arduous task. Further, redesigning one net in the critical path is not considered with respect to its affect on other nets in other critical paths that might also include the redesigned critical net. Consequently, redesigning one net in one critical path might help or hinder fixing other critical paths.

Thus, there is a need for a simple critical path analysis tool.

BRIEF DESCRIPTION OF THE INVENTION

The present invention is a method of integrated circuit design and circuit design tool. Critical paths are identified in an integrated circuit design. Identified edges are weighted. Edges are assigned a higher weight, responsive to the number of critical paths in which they are included. A net criticality is assigned to each weighted edge based upon the edge's weight. Cells are re-placed and wired according to net criticality.

BRIEF DESCRIPTION OF THE DRAWINGS

FIG. 1 shows a simple example of a cross section of logic after placement and wiring;

FIG. 2 is an example of a flow diagram showing net penalty adjustment;

FIG. 3 is a second example of a placed and wired logic cross section;

FIG. 4 shows a flow diagram for adjusting net penalties;

FIG. 5A is an example of start to end traversal of the logic section of FIG. 3;

FIG. 5B shows an example of results of traversal of the same graph of FIG. 3 from end to start;

FIG. 5C shows an example of weighted sum from FIGS. 5A–B applied to the graph edges;

DESCRIPTION OF PREFERRED EMBODIMENTS

Turning now to the drawings and more particularly FIG. 1 shows a simple example of a cross section of logic 100 after placement and wiring. This cross sectional example 100 includes generic cells or logic blocks 102, 104, 106, 108, 110, 112, each labeled A, B, C, D, E, F, respectively. Further, having been placed and wired, the logic blocks 102, 104, 106, 108, 110, 112 are shown with nets connected between pins at the particular blocks. For simplicity, nets are referred herein to by an originating logic block and its corresponding terminating logic block, e.g., AD, DE, DF, etc. Each of the generic logic blocks 102, 104, 106, 108, 110, 112 may represent any function of any complexity and are not intended as a limitation, but are for illustration only.

For further illustration herein, logic is shown with input pins on the left and output pins on the right, logic signals flowing from left to right and and edge refers to a logic signal propagating through logic. A timing graph is a representation of a logic segment as nodes connected by edges wherein the nodes correspond to block pins. Edges may be cell edges or net edges. Cell edges are internal to cells or blocks, i.e., input pin to output pin. Net edges are between blocks, i.e., output pin to input pin. An incoming edge is an input edge to an input pin. Traversing a logic diagram or graph refers to following edges through the logic in the direction indicated. Thus, traversing a graph from start to end refers to: starting at starting blocks on the left where incoming edges first arrive; and following the logic path therefrom. All incoming edges must be examined at a block before any subsequent blocks or edges may be examined. Furthermore, for the discussion hereinbelow reference to traversing from start to end or in a forward direction indicates that logic paths are followed from a starting block, e.g., 102 or 104, through intermediate blocks, e.g., 108, to a terminating block, e.g., 110 or 112. Traversal from end to start or reverse traversal follows the reverse paths.

FIG. 2 is an example of a flow diagram showing a preferred method of circuit design 120 wherein net penalty adjustment is used for improved placement and wiring. First, in step 122, an initial netlist is input for a design after place and wire. Then, in step 124 a slack graph is generated. In step 126 edge penalties are calculated for weighting edges to adjust placement to improve timing. Timing bottlenecks are identified and in step 128 net penalties are adjusted. In step 130 critical path cell placement is adjusted to reduce or eliminate bottlenecks. In step 132 the placement is checked for any remaining paths that require delay reduction. Once in step 132 no additional path delay improvement may be done, then in step 134 the bottleneck reduction is complete. Otherwise, in step 132 if path delays may still be improved, returning to step 122, the slack graph is regenerated. Net changes may impact the slack graph, and new nets will become critical. During redesign, cells are being moved around, i.e., re-placed and checked for improvements to timing, wirelength, etc. When pre-selected exit criteria are met in step 132, even though it may still be able to improve the placement, it has been determined that the extra time required is simply not worth the additional improvement. Upon meeting this exit criteria, in step 134 placement is considered complete. The resulting output from step 134 is the final design placement and the analysis is complete.

So, following the path analysis rules according to the present invention, first in step 124 a modified slack graph is created for a placed and wired logic function. The delays between registers are summed to determine path delay. Once the slack for each path has been determined, non-critical paths are deleted.

In step 126, a slack penalty is assigned to each weighted edge based upon that edge's slack. The edges are sorted according to slack penalty, e.g., worst case to best case. An edge criticality value is then assigned to each edge based on its sort position. The edge criticality value also may depend upon slack penalty distribution. A number of worst case edges, typically, much less than 100%, e.g., one percent (1%), are assigned a highest criticality value of 10; another 1% may be assigned a moderate criticality value of 5. For this example, that 2% moderate to high criticality edges are all that are given emphasis for re-placement and wiring with the remaining 98% being assigned a criticality value of zero and so, given much less emphasis.

In step 128 edges are weighted based on commonality to critical paths. Edges are either node edges, i.e., inputs to a block/cell or net edges, i.e., outputs from a block/cell. Edge type is stored in the timing graph with the edge. Also, any given net may have more than one edge associated with it. In determining edge weights, the slack graph is traversed start to end (forward) then end to start (reverse). Actual cell/net delays are ignored. Instead, logic sequence is adhered to strictly for each graph traversal.

Traversing the graph for the example of FIG. 1, the edges at block A 102 and block B 104 must be considered before edges at block D 108. The edges at block D 108 must be considered before edges at blocks E 110 and F 112. Edges at blocks C 106 and D 108 must be considered before edges at block F 112. Accordingly, traversing from end to start would place opposite constraints on timing edges, e.g., edges at blocks E 110 and F 112 must be considered before edges at blocks D 108 or C 106. However, the order of traversal through a particular bottleneck block (i.e., where edges converge/diverge) is arbitrary, e.g., through block E 110 and then through block F 112 or, through block F 112 followed by block E 110 are equally acceptable path traversals.

Each net's criticality value indicates the maximum net criticality value of that net's edges. Edges with a zero criticality value are labeled as non-critical edges. Edges with a criticality value greater than zero are labeled as critical edges. The criticality values are a placement cost function that in step 130, focus attention on the highest criticality edges within critical paths for adjusting placement and wiring to eliminate critical edges while de-emphasizing other nets. Optionally, edge penalty adjustment in step 128 may be focused only on individual driver to pin pairs such that only the net edge penalties are considered. Typically, however, the focus is more generally directed to improving each net and so, criticality values are assigned to the nets and nets with the highest criticality are adjusted.

FIG. 3 is an example of critical paths in a placed and wired logic cross section 140. Starting points are at blocks 142, 144 and 146. Intermediate points are at blocks 148, 150, 152, 154, 156 and 158. End points are at blocks 160 and 162. Following the convention of FIG. 1, edges within the cross section are at segments AD, DG, GH, HJ, BE, EG, HI, IK, CF, and FI. Further, there are five unique paths; all considered critical for this example. They are:

| 1) | A, D, G, H, J       | –AJ |
|----|---------------------|-----|
| 2) | A, D, G, H, I, K    | –AK |
| 3) | B, E, G, H, J       | –BJ |
| 4) | B, E, G, H, I, K    | –BK |
| 5) | C, F, I, K          | –CK |

So, improving (shortening) the timing of edge AD effects two paths, paths AJ and AK above. However, improving timing edge GH improves the timing of four paths AJ, AK, BJ and BK. Thus, it can be seen that, everything else being equal (i.e., both edges being roughly equal), improving bottleneck GH is more efficient than improving AD.

As noted above, the slack graph is traversed, first forward from start to end and then, in reverse from end to start, assigning edge weights within the path in each direction. After traversing the slack graph in each direction, the edge weights are summed for each edge. The summed edge weights identifies edges that are most likely to affect multiple critical paths within each logic segment, i.e., the most heavily weighted edges are critical edges identified with bottlenecks. So, generally, redesign emphasis is placed on bottlenecks. Edges in more critical paths (bottlenecks) are assigned a higher edge criticality than other edges, i.e., those that are not in as many critical paths. Edges with the highest weight sum (i.e., the biggest bottlenecks) are the focus of subsequent cell replacement and any logic redesign.

So, according to the present invention bottlenecks are identified as nodes wherein the number of incoming edges does not equal the number of outgoing edges. If the number of incoming edges is less than the number of outgoing edges, then the number of paths that include each incoming edge is greater than the number of paths that include each outgoing edge, and vice versa.

Additionally, disjoint or mostly disjoint slack graph portions are considered and weighted such that all paths are optimized. For example, edge HI is part of paths AK and BK. It might be possible to reduce delay through edge HI such that paths AK and BK no longer are critical. The other three paths AJ, BJ and CK would remain critical and do not contain a single common edge. So, for this example, at least two other edges still would have to be reduced to reduce the delays through all three paths. By contrast, edge HJ is also only in two paths, AJ and BJ and so reducing the delay through HJ would not effect the other three paths AK, BK and CK. However, AK, BK and CK all include IK and may be reduced by reducing IK. Accordingly, assigning a higher priority (i.e., criticality) to HJ than to HI facilitates identification of most situations such as this, allowing the logic replacement to proceed much more rapidly.

FIG. 4 is a flow diagram showing how net penalties are adjusted in step 128 of FIG. 2. In step 1280, the initial starting slack graph is input with paths marked as critical, or non-critical. Then, in step 1282, the non-critical edges are removed from the timing graph. In step 1284, path variables are initialized. In step 1286, traversing from start to end through the slack graph, edges are weighted for the forward traverse. Likewise, in step 1288, traversing from end to start through the slack graph, edges are weighted for the reverse traverse. In step 1290, cumulative edge values are determined for each edge by summing forward traverse and reverse traverse values. In step 1292, path values are determined for each net based on the values associated with its slack graph edges. The original net penalties are adjusted in step 1294 by using the new net criticalities from step 1292. Finally, in step 1296, the resulting output is a new set of net penalties with timing bottlenecks highlighted.

So, after initial slack analysis has been done on the logic and a slack graph has been generated, an initial set of edge criticalities is determined based on that slack. In step 1282, non-critical edges are identified and removed from the slack graph to simplify the graph. In step 1284, the edge analysis variables are initialized for each edge. Analysis variables include an input path variable and output path variable and a sum variable. The input path variable is the forward path traversal edge weight. The output path variable is the reverse path traversal edge weight. The path variable is the sum of the input path variable and the output path variable. Initially, these path variables are set to zero for each edge.

In step 1286, edges are weighted while traversing the slack graph from start to end. FIG. 5A shows an example of the results of step 1286, forward traversal from start to end of the logic section 140 of FIG. 3. Each node weight is dependent upon the value of the forward path traversal variable of incoming edges (IE). The start to end or forward weight (FI(node)) for a particular node is determined by the relationship:

1) If IE=0, FI (node)=0.
2) If IE>0, FI (node)=minimum value of FI (edge) for all incoming edges.

Likewise, with the number of outgoing edges (OE), the start to end or forward weight (FI (edge)), for each outgoing edge is determined by the relationship:
FI (edge)=FI (node)+OE−1.

Similarly, in step 1288, traversing the graph from end to start and weighting each edge, the output weights, FO (node) and FO (edge), are set for that particular node or edge. FIG. 5B shows an example of results of traversal of the same graph 420 of FIG. 3 from end to start in step 1288. Each node/net weight is dependent upon the reverse path traversal value of outgoing edges (OE). The end to start or reverse weight (FO (node)) for a particular node is determined according to the relationship:

1) If OE=0, FO (node)=0.
2) If OE>0, FO (node)=minimum value of FO (edge) for all outgoing edges.

As above, with the number of incoming edges (IE), the end to start or reverse traversal weight (FO(edge)) for each incoming edge is determined by the relationship:
FO (edge)=FO (node)+IE−1

FIG. 5C shows an example of step 1290 applied to FIGS. 5A–B where for each edge the weights are summed. So, remembering that any net can have more than 1 edge, with FP (edge) and FP (net) being the path variable for a particular net/edge in the graph:
FP(edge)=FI (edge)+FO (edge).
In general, nets with a low value of FP (net) are included in more critical paths as compared to nets with high values of FP (net). In step 1292, for each edge in the graph, the net associated with a particular edge is used to update the net weight value, such that the weight for the net (FP(net)) is the minimum weight of any of the net's edges, So, in step 1294, nets that have a low value of FP(net) include more critical paths when compared to nets with a high values of FP(net). These numbers are used to adjust net penalties accordingly (i.e., criticalities of nets belonging to large bottlenecks are increased more relative to criticalities of nets that belong to few bottlenecks).

Thus, critical paths are quickly, effectively and efficiently eliminated or minimized by reducing path edge delays at bottlenecks first, where the reduction will be most effective. Multiple critical paths may be rendered non-critical, simultaneously, when a single bottleneck is redesigned because it is assigned a higher priority than other nets, based on its weighted slack penalty. In particular, a heavily weighted net with a seemingly innocuous delay may be assigned a higher priority than other nets with the same or longer delays in the same path. Advantageously, the present invention focuses critical path analysis and design on reducing bottleneck delays that will produce the largest results.

While the invention has been described in terms of preferred embodiments, those skilled in the art will recognize that the invention can be practiced with modification within the spirit and scope of the appended claims.

What is claimed is:

1. A method of integrated circuit design comprising steps of:
    (a) placing and wiring an integrated circuit design;
    (b) generating a slack graph of critical paths in the integrated circuit design;
    (c) identifying bottlenecks in the critical paths wherein identifying bottlenecks comprises determining which nets in the slack graph include more critical paths when compared to other nets in the slack graph; and
    (d) assigning a higher priority to reducing path edge delays at the bottlenecks than to other path edge delays.

2. A method of integrated circuit design comprising steps of:
    (a) placing and wiring an integrated circuit design;
    (b) generating a slack graph of critical paths in the integrated circuit design;
    (c) identifying bottlenecks in the critical paths wherein identifying bottlenecks comprises determining which nets in the slack graph include more critical paths when compared to other nets in the slack graph identifying bottlenecks comprises calculating a forward node weight for each corresponding node wherein the forward node weight is equal to a minimum forward edge weight of all incoming edges to the corresponding node.

3. The method of claim 2 wherein step (c) comprises calculating a forward edge weight for each outgoing edge wherein the forward edge weight is equal to the forward node weight of the corresponding node plus a number of outgoing edges from the corresponding node minus one.

4. The method of claim 3 herein step (c) comprises calculating a reverse node weight for each corresponding node wherein the reverse node weight is equal to a minimum reverse edge weight of all outgoing edges from the corresponding node.

5. The method of claim 4 wherein step (c) comprises calculating a reverse edge weight for each incoming edge wherein the reverse edge weight is equal to the reverse node weight of the corresponding node plus a number of incoming edges to the corresponding node minus one.

6. The method of claim 5 wherein step (c) comprises summing the forward edge weight and the reverse edge weight for each edge in the slack graph.

7. The method of claim 6 wherein step (c) comprises setting a net weight value of a corresponding net equal to a minimum value of the sum of the forward edge weight and the reverse edge weight associated with each edge so that a relatively low net weight value indicates that the corresponding net belongs to a bottleneck.

8. A computer-readable medium having stored thereon a plurality of instructions, the plurality of instructions including instructions which, when executed by a processor, cause the processor to:
  (a) place and wire an integrated circuit design;
  (b) generate a slack graph of critical paths in the integrated circuit design;
  (c) identify bottlenecks in the critical paths; and
  (d) assigning a higher priority to reducing path edge delay, at the bottlenecks than to other path edge delays.

9. A computer-readable medium having stored thereon a plurality of instructions the plurality of instructions including instructions which, when executed by a processor, cause the processor to:
  (a) place and wire an integrated circuit design;
  (b) generate a slack graph of critical paths in the integrated circuit design; and
  (c) identify bottlenecks in the critical paths wherein identifying bottlenecks comprises calculating a forward node weight for each corresponding node wherein the forward node weight is equal to a minimum forward edge weight of all incoming edges to the corresponding node.

10. The computer-readable medium of claim 9 wherein step (c) comprises calculating a forward edge weight for each outgoing edge wherein the forward edge weight is equal to the forward node weight of the corresponding node plus a number of outgoing edges from the corresponding node minus one.

11. The computer-readable medium of claim 10 wherein step (c) comprises calculating a reverse node weight for each corresponding node wherein the reverse node weight is equal to a minimum reverse edge weight of all outgoing edges from the corresponding node.

12. The computer-readable medium of claim 11 wherein step (c) comprises calculating a reverse edge weight for each incoming edge wherein the reverse edge weight is equal to the reverse node weight of the corresponding node plus a number of incoming edges to the corresponding node minus one.

13. The computer-readable medium of claim 12 wherein step (c) comprises the forward edge weight and the reverse edge weight for each edge in the slack graph.

14. The computer-readable medium of claim 13 wherein step (c) comprises a net weight value of a corresponding net equal to a minimum value of the mum of the forward edge weight and the reverse edge weight associated with each edge so that a relatively low net weight value indicates that the corresponding net belongs to a bottleneck.

\* \* \* \* \*